April 22, 1969

H. B. ALLEN 3,439,460

GEODESIC DOME STRUCTURE

Filed July 14, 1967

INVENTOR

HOWARD B. ALLEN

BY *Baldwin Wight Diller & Brown*

ATTORNEYS

INVENTOR
HOWARD B. ALLEN

April 22, 1969

H. B. ALLEN 3,439,460

GEODESIC DOME STRUCTURE

Filed July 14, 1967

INVENTOR
HOWARD B. ALLEN

BY Baldwin, Wight, Miller & Brown
ATTORNEYS

INVENTOR
HOWARD B. ALLEN

BY Baldwin Wight Diller & Brown
ATTORNEYS

# United States Patent Office 3,439,460
Patented Apr. 22, 1969

3,439,460
GEODESIC DOME STRUCTURE
Howard B. Allen, 334 1st Ave.,
Charles Town, W. Va. 25414
Filed July 14, 1967, Ser. No. 653,553
Int. Cl. E04b 1/32, 7/08
U.S. Cl. 52—81
44 Claims

ABSTRACT OF THE DISCLOSURE

A geodesic dome of generally part-spherical form includes a belt structure comprising an annular succession of adjacent face-linked tetrahedral modules formed of sheet material. In a horizontal succession of modules there are alternate modules having triangular faces and intervening modules having triangular faces, two faces of each alternate module being in face-to-face contact respectively with two faces of intervening modules on opposite sides of the included alternate module. Adjacent modules are connected, inter alia, along lines extending along radii of the sphere, thus providing ribs of trusses extending spirally generally from base to top of the modular structure. One half of the trusses are spiralled in one direction, and the other half are spiralled in the opposite direction. All trusses together provide a scissors type truss system resistant to twisting forces.

---

This invention relates to geodesic domes, and more particularly to such domes formed, for example, of sheet material such as aluminum or other metal. Domes of this general category have been proposed, and indeed some constructed, heretofore.

One object of the invention is to provide an improved geodesic dome of which its simplicity of design and manufacture, including erection, its stability and stress resisting capabilities, and other desirable attributes derive basically from a unique arrangement of tetrahedral modules which are linked to one another facially as distinguished from marginally.

Another object of the invention is to provide a dome structure of the character stated in which the modules are so relatively arranged and interconnected as to provide a scissors type truss system having unusual capacity to resist applied twisting loads.

Other objects of the invention will become apparent from a reading of the following description of a representative embodiment, the appended claims, and the accompanying drawings, in which:

FIGURE 15, Sheet 4, is a fragmentary section on the lower part of the line 15—15 of FIGURE 1, showing the mounting of the modular structure on a foundation;

FIGURE 16, Sheet 4, is an enlarged scale, detailed section on the line 16—16 of FIGURE 15, showing the mounting of a securing hub in a fish plate carried by the foundation;

FIGURE 17, Sheet 4, is a fragmentary perspective view of the top part of the dome structure;

FIGURE 18, Sheet 4, is a section on the line 18—18 of FIGURE 17;

FIGURE 19, Sheet 4, is a fragmntary section on the line 19—19 of FIGURE 18;

FIGURE 20, Sheet 4, is an enlarged scale section on the line 20—20 of FIGURE 19;

FIGURE 21, Sheet 4, is an exploded perspective view of two adjacent modules in the upper part of the dome and a fitting received by these modules when connected for mounting or locating a tensioning cable or the like;

This invention is illustrated as being embodied in a dome structure DS formed of modular components and supported on a foundation F of any suitable construction, for example concrete or masonry.

The dome structure DS is in the general shape of a portion of a sphere, somewhat less than a hemisphere, the bottom or base of the structure DS being in a horizontal plane spaced somewhat above the sphere equator, that is being above the horizontal diametral plane through the sphere. In the illustrative embodiment, the horizontal plane containing the bottom of the structure DS is spaced above the sphere equator such a distance that a radius of the sphere passing through the dome structure at the periphery of its base is at an angle of thirty degrees to the horizontal diametral plane of the sphere. This relationship, although applying to the illustrative embodiment, need not necessarily be followed or used in other constructions embodying the invention.

Figure 1:
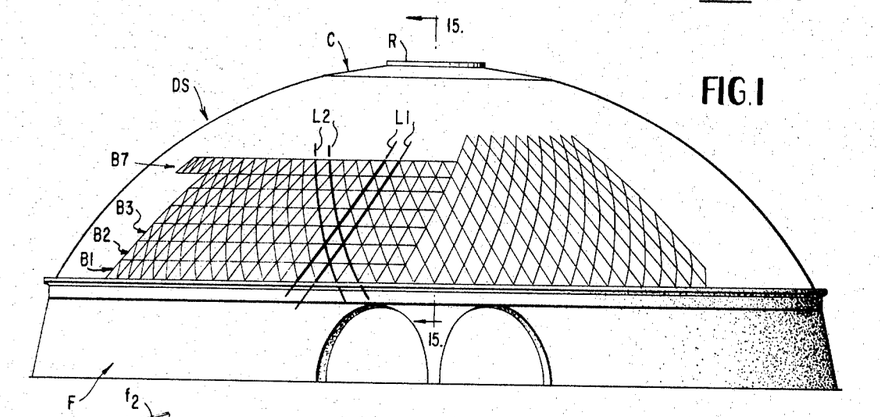
FIGURE 1, Sheet 1, is an elevation of a dome structure embodying the invention.

The dome structure DS is constituted broadly by a plurality of superimposed and connected modular belts B1, B2–B14, there being fourteen such belts, beginning at the thirty degree line at the base of the structure and continuing upwardly to the seventy-two degree level where the structure is capped by an assembly C of modules C1, C2–C9, etc., and a central ring R.

Each belt B1, B2, etc., is formed of strip sheet material, e.g., sheet metal such as aluminum or other. Where bending or folding machinery and working area are sufficient and where the dome is not so large as to require belts of prohibitively large peripheral extent, belts may be constituted by a single strip of sheet material folded and bent as hereinafter described. However, in many instances the size of the structure and the available manufacturing equipment and space are such that it is convenient to form at least certain of the belts of a plurality of belt portions joined end-to-end.

Structures according to the invention are importantly characterized by a particular formation of tetrahedral modules in each belt, making for most efficient use of the material and producing a readily assembled, durable structure capable of supporting itself and applied load without requiring additional supporting framework. The modules in each belt are linked facially as distinguished from being linked marginally, each module conforming to the shape of a tetrahedron.

Figure 3:
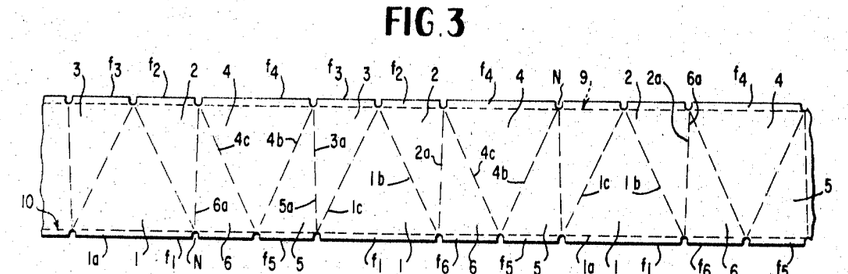
FIGURE 3, Sheet 3, is a plan view of a sheet material strip from which a belt of face linked tetrahedral modules is to be formed, fold lines being shown in dash lines.
Figure 4:
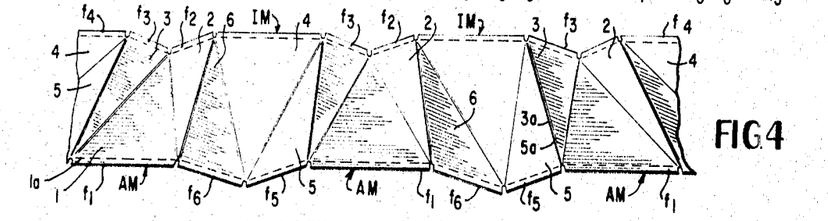
FIGURE 4, Sheet 3, is a top perspective view of the strip shown in FIGURE 3 after folding has been started.
Figure 5:
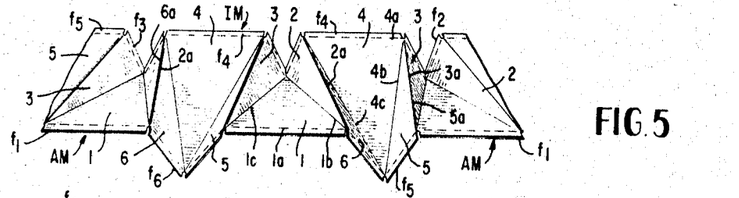
FIGURE 5, Sheet 3, is a perspective view of the strip after further folding.
Figure 6:
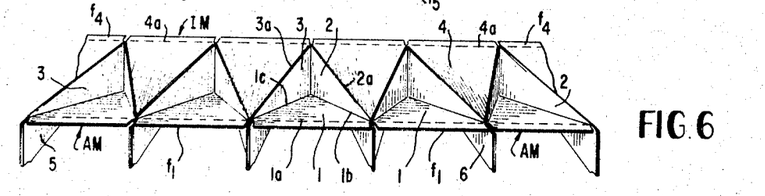
FIGURE 6, Sheet 3 is a perspective view of the strip in its finally folded form.

FIGURES 3–6 illustrate the formation of a modular belt section, details of the belt section being shown also in FIGURES 9–13. The lines of folding the initially flat strip to form the face linked tetrahedral modules are shown in dash lines in FIGURE 3. FIGURES 4, 5 and 6 show progressive steps in the folding operation. As shown in FIGURES 4, 5 and 6, a belt section in accordance with the invention includes an annular succession or repeating series of alternate modules generally designated AM and intervening modules generally designated IM.

Each alternate module AM is of tetrahedral form having one open face and three closed faces 1, 2 and 3. The first closed face 1 has the form of an isosceles triangle and, when in place in the dome structure, its base or lower edge 1a is substantially tangent to the general circular extent of the belt in a horizontal plane. The second closed face 2 is bent to extend at an angle to the plane of the first closed face 1 from one other edge 1b of the face 1. The third closed face 3 of the module AM is bent to extend at an angle to the plane of the first face 1 from the third edge 1c of the first face 1. The fourth face of the alternate tetrahedral module AM, as formed from the strip, is open and is delineated by the edge 1a of the first face 1 and edges 2a and 3a respectively of the second face 2 and the third face 3. While the first closed face 1 is in the form of an isosceles triangle, the second and third faces 2 and 3 are asymmetrical triangles.

Each of the intervening modules IM is also of tetrahedral form having one open face and three closed faces 4, 5 and 6. The first closed face 4 is shaped as an isosceles triangle and, when the module IM is in place in the dome structure, one edge 4a of the face 4 is substantially tangent to the belt, that is substantially tangent to the generally circular extent of the belt in a horizontal plane. The second closed face 5 extends at an angle to the plane of the first face 4 from one other edge 4b of the first face 4. The third closed face 6 extends at an angle to the plane of the first closed face 4 from the remaining edge 4c of the latter. While the first face 4 is in the shape of an isosceles triangle, the faces 5 and 6 are shaped as asymmetrical triangles. The fourth face of the tetrahedral module IM, as formed from the strip material, is open and is delineated by the edge 4a of the first face 4 and edges 5a and 6a respectively of the second face 5 and third face 6.

The apices of the alternate modules AM and the intervening modules IM point respectively in opposite directions, that is relatively upwardly and downwardly in vertical plane great circles of the sphere.

It is to be noted that the edge 2a of the second face 2 of the alternate module AM is the same as the edge 6a of the third face 6 of the adjacent intervening module IM, these edges 2a and 6a being along a common fold line between the faces 2 and 6 of adjacent modules AM and IM. Similarly, the edge 3a of the third face 3 of the alternate module AM is the same as the edge 5a of the second face 5 of the adjacent intervening module IM, the edges 3a and 5a being along the fold line between the faces 3 and 5.

Figure 7:
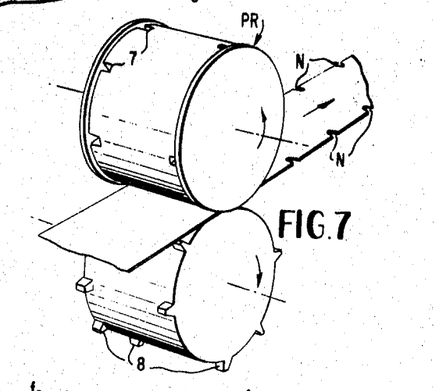
FIGURE 7, Sheet 6, is a perspective view schematically indicating a first set of rolls for notching the edges of the strip as shown in FIGURE 3.

Strips for forming the belts or belt sections may be prepared in any suitable way, and conveniently the initial formation of strips is accomplished by the use of rolls. FIGURE 7 shows schematically a set of preliminary forming rolls PR through which a strip is passed merely to form notches N in the strip edges to facilitate subsequent folding, and to provide clearance for receiving securing hubs described hereinafter. The upper roll shown in FIGURE 7 is formed with a number of depressions 7 and the lower roll is formed with projections 8 adapted to enter the depressions 7 so as to punch out strip edge material to provide the notches N. FIGURE 3 shows the condition of the strip after it has passed through the rolls PR with the notches having been formed but without folding having been started, the dash lines in FIGURE 3 merely indicating the location of lines along which folds are to be made during subsequent operations.

Figure 8:
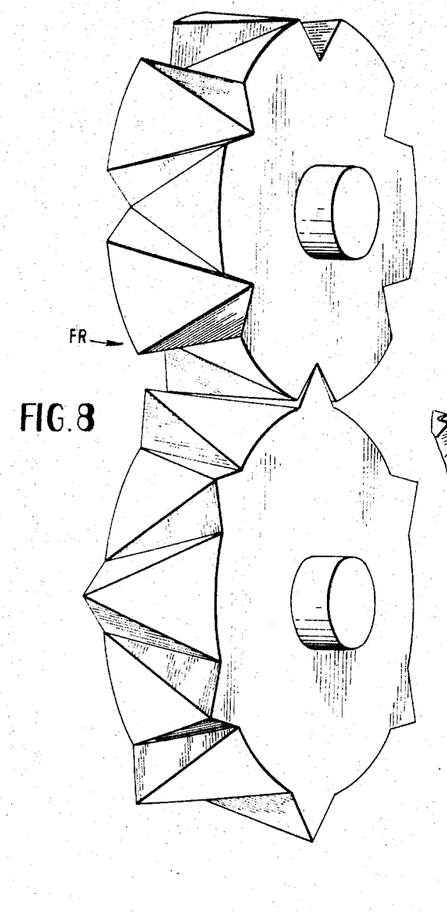
FIGURE 8, Sheet 6, is a perspective view of a set of rolls for partially folding the strip to the form shown in FIGURE 4.

Folding of the strip shown in FIGURE 3 is started by passing the strip through a pair of folding rolls FR shown in FIGURE 8. The peripheries of the rolls FR are formed with projections adapted to mesh with one another and which are so shaped as to start the folding along the dash lines shown in FIGURE 3 so that when the strip has passed through the rolls FR, the strip will have the partially folded form shown in FIGURE 4. The fold lines having been established by the rolls FR, the folding into the final modular form shown in FIGURE 6 is carried out by any suitable sheet material working procedure well known, for example, in the sheet metal working art.

As described hereinafter, the modular strips are attached end-to-end within the same belt of modules and in superimposed belt relationship. In the illustrative embodiment, the attachment is effected by means including edges or flanges formed integrally with the modules. These edges or flanges are delineated in the strip length shown in FIGURE 3 by dash lines 9 and 10 adjacent to the longitudinal edges of the strip, and by the notches N. As will be seen from consideration of FIGURE 5 in connection with FIGURES 4, 5 and 6, individual flanges are formed on module parts according to the following tabulation:

Alternate modules AM

| Module part: | Flange |
|---|---|
| First closed face 1 | f1 |
| Second closed face 2 | f2 |
| Third closed face 3 | f3 |

Intervening modules IM

| Module part: | Flange |
|---|---|
| First closed face 4 | f4 |
| Second closed face 5 | f5 |
| Third closed face 6 | f6 |

Figure 9:
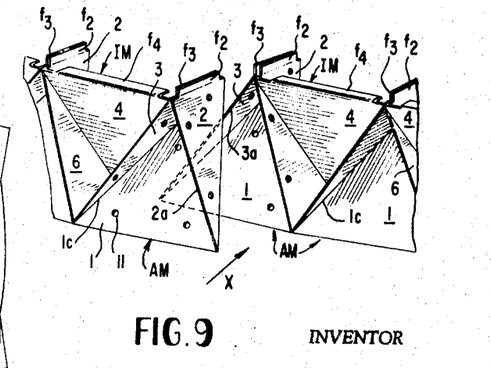
FIGURE 9, Sheet 6, is a separated or exploded view illustrating end attachment of the opposite ends of a single strip forming a modular belt, or the end attachment of two strips in the same belt when a belt is formed of more than a single strip.

When end or terminal portions of modular strips are to be connected to one another in the same belt, either because of using more than one modular strip in the same belt or because of joining the terminal ends of the same strip in one belt, terminal ends of a strip or strips to be joined are prepared and preliminarily positioned as shown in FIGURE 9. The strip part at the left in FIGURE 9 is the right terminal end portion of a strip which is altered by cutting along the edge 2a–6a which will be recalled to be the common fold line between the second face 2 of a module AM and the third face 6 of a module IM. This leaves the extreme terminal end as being constituted by the second face 2 of the module AM at the left in FIGURE 9. The strip portion at the right has the left end of a modular strip altered by cutting along the edge 3a–5a which is the common fold line between the third face 3 of the module AM and the second face 5 of the adjacent module IM. This cutting leaves the terminal end of the strip portion at the left in FIGURE 9 constituted by the third face 3 of the terminal module.

As shown in FIGURE 9, the terminal end 2 of the strip section shown at the left has its flange $f2$ closed upon, that is in face-to-face contact with the flange $f3$ in the same module AM. However, the terminal strip portion at the right in FIGURE 9 has its contiguous flanges $f2$ and $f3$ spread or slightly separated. Joining of the two strip ends is effected by moving the strip end at the left of FIGURE 9 in the direction of the arrow X so as to slide the mutually contacting flanges $f2$ and $f3$ between the separated flanges $f2$ and $f3$ of the strip part at the right. In effect, the pair of mutually contacting flanges $f2$ and $f3$ of the left-hand section are sandwiched between the pair of flanges $f2$ and $f3$ of the right-hand section. The first closed faces 1 of the end modules AM will then lie flat against each other as will the second closed faces 2 and the third closed faces 3 of the respective end modules. The end modules in this nested relation may be secured together in any suitable manner, as by rivets passed through holes 11, and by other means described hereinafter.

Figures 10, 11:
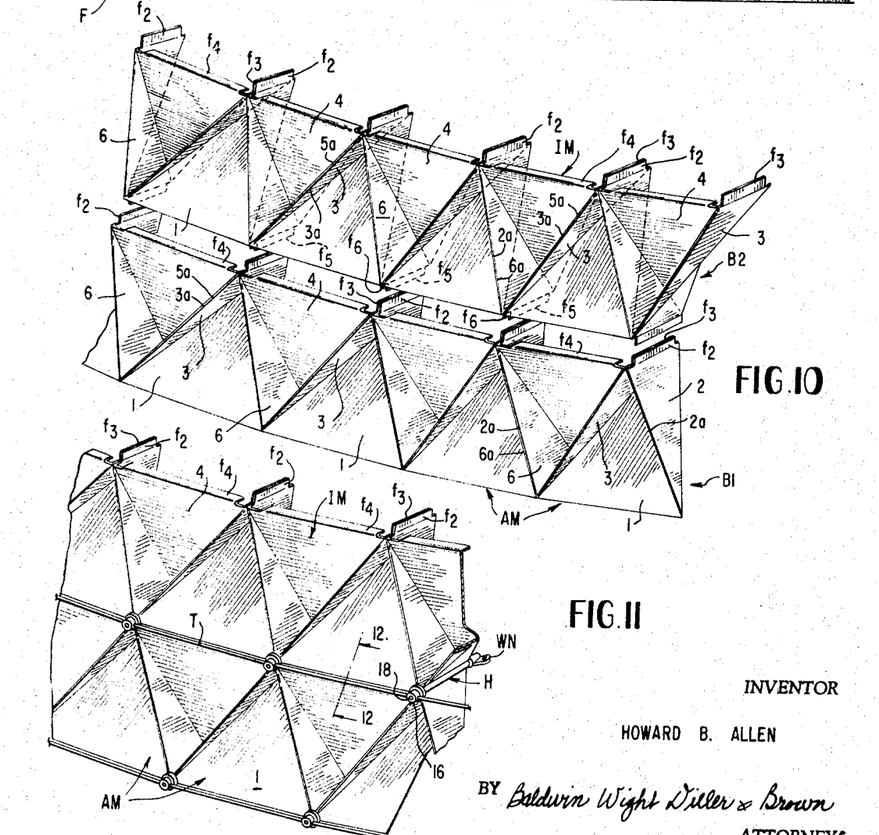
FIGURE 10, Sheet 1, is an exploded perspective view showing portions of two vertically adjacent belts positioned preparatory to being attached to one another.
FIGURE 11, Sheet 1, is a perspective view showing the belt portions of FIGURE 10, attached to each other.

Attachment of vertically adjacent belts to one another is effected in part by interconnection of spaced pairs of contacting flanges $f2$ and $f3$ projecting upwardly from the top of a lower belt, e.g., the belt B1 in FIGURE 10, and pairs of slightly separated flanges $f5$ and $f6$ spaced along the bottom of the next upper belt B2. FIGURE 10 illustrates the positioning of portions of vertically adjacent belts B1 and B2 just prior to being brought together in assembly and secured to one another. The upwardly extending flanges $f2$ and $f3$ of each pair of such flanges are in close contacting relation, and are aligned with downwardly extending pairs of flanges $f5$ and $f6$ which are slightly spread apart to provide clearance. In assembling, the belt B2 is lowered onto the belt B1 so that the flange pairs $f2$, $f3$ extending upwardly from the belt B1 are received in the clearances between the flanges $f5$ and $f6$ extending downwardly from the belt B2. In this manner, the flange pairs $f2$, $f3$ are sandwiched between the flanges of the flange pairs $f5$, $f6$. The sandwiches $f2$, $f3$, $f5$ and $f6$ are then secured as explained hereinafter.

Figures 12, 13:
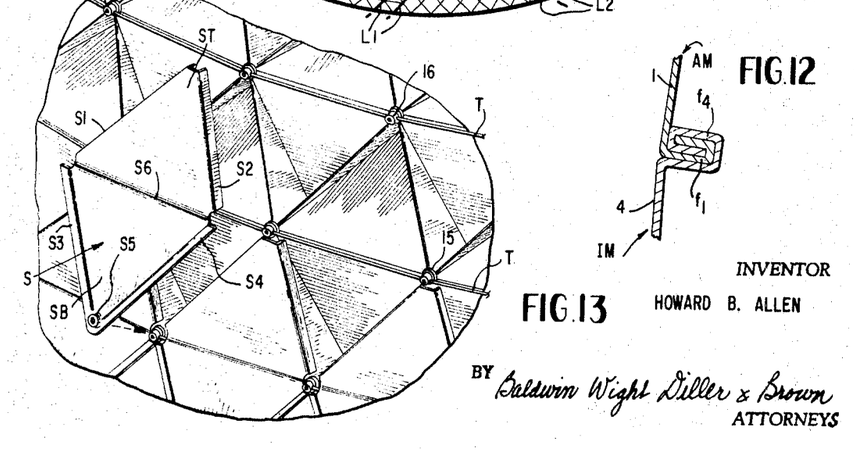
FIGURE 12, Sheet 2, is an enlarged scale, detailed section on the line 12—12 of FIGURE 11 showing the formation of a seam between parts of two vertically adjacent belts.
FIGURE 13, Sheet 2, is a fragmentary perspective view of a portion of the assembled dome structure, showing reinforcing tensioning cables and, in detached position, one of a number of shingle-like elements applied to the outside of the dome structure for closing open faces of the tetrahedral modules and for reinforcing the dome structure.

Securing of the belts B1 and B2 together is effected, in part, by forming a lock seam joint between each flange $f1$ of an alternate module AM and a mating flange $f4$ of a vertically adjacent module IM. One suitable seam formation is shown in FIGURE 12, being a conventional sheet metal working seam. In using such a construction, part of the edge of the flange $f1$ is advantageously trimmed off so that before forming the seam the flange $f1$ will be more narrow than the flange $f4$.

Figure 14:
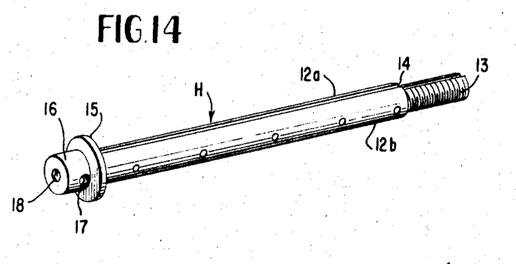
FIGURE 14, Sheet 3, is a detailed perspective view of a hub or securing element for tying together portions of modules in vertically adjacent belts.

Vertically adjacent belts are additionally secured together by holding means, e.g., hubs H, one of which is shown in detail in FIGURE 13, the hubs H also serving for other purposes explained hereinafter. As shown in FIGURE 14, each hub H comprises a split shank having halves or opposed sections 12a and 12b, one end of the shank being formed with a threaded portion 13 and a shoulder 14. The other or outer end of the hub has a fixed collar 15 and a projecting stub 16 provided with a transverse hole 17 and a threaded axial opening 18.

Figures 15, 16, 17, 18, 19, 20, 21:
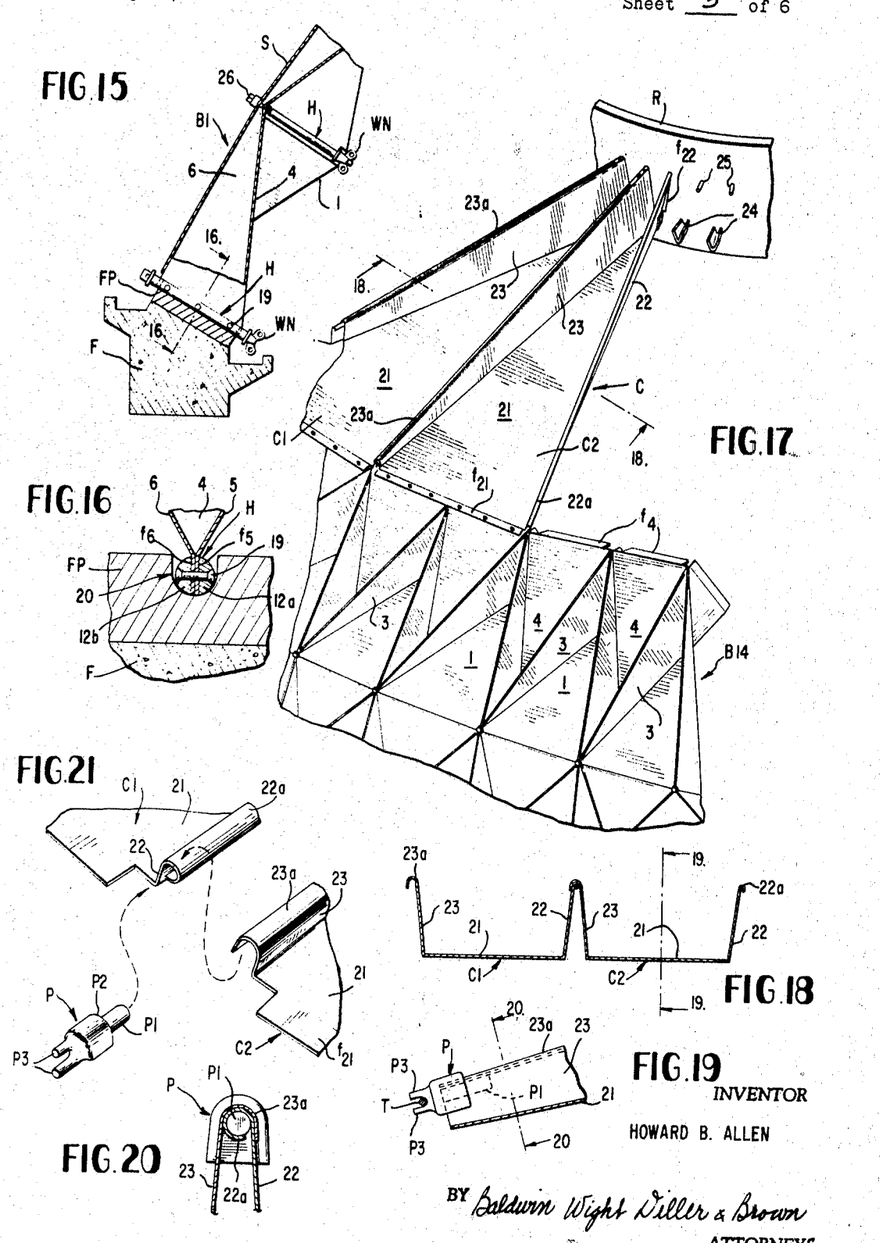
Figures 22, 23, 24:
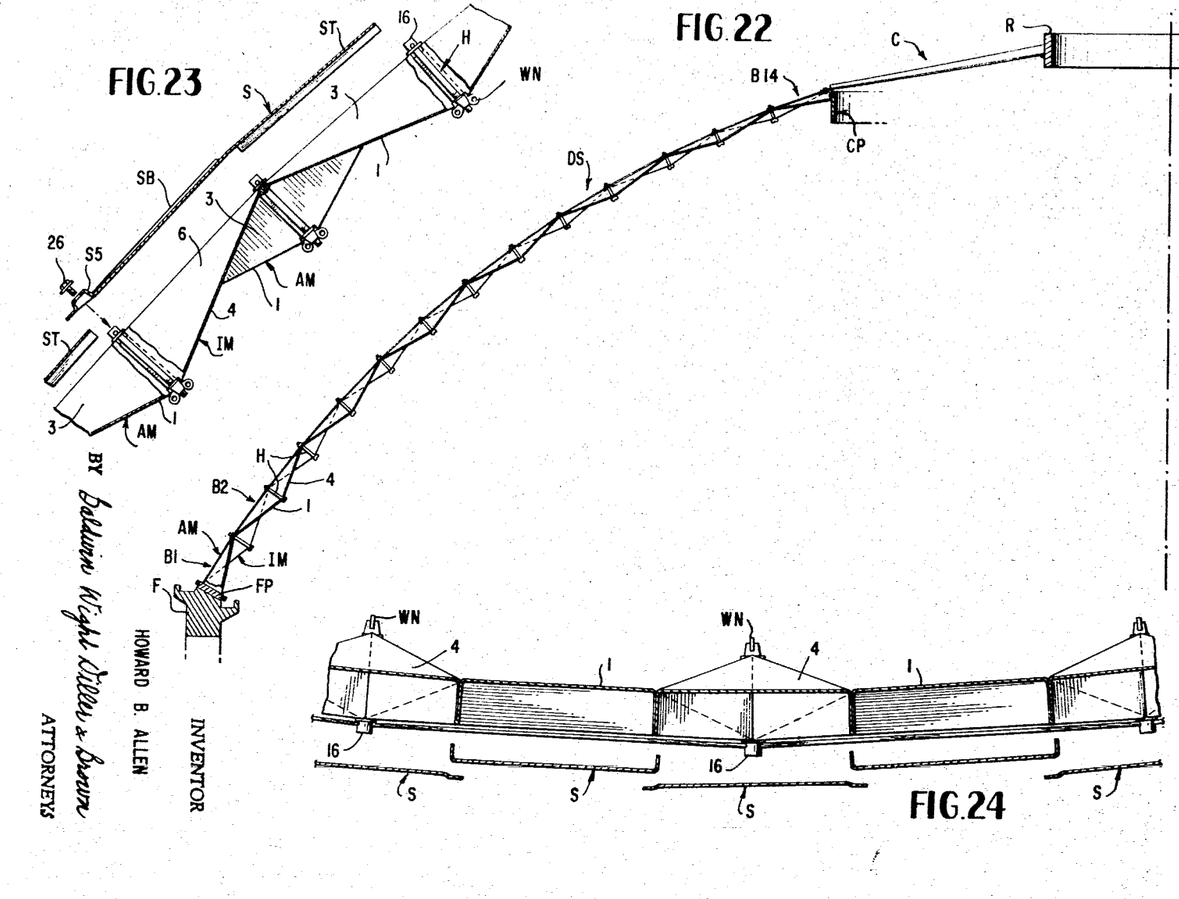
FIGURE 22, Sheet 5, is an enlarged scale section on the line 15—15 of FIGURE 1, showing one-half of the dome structure.
FIGURE 23, Sheet 5, is a fragmentary vertical section, being an enlargement of a portion of FIGURE 22.
FIGURE 24, Sheet 5, is a fragmentary horizontal section through one belt.

As shown in FIGURES 11, 15 and 23, a hub H projects from the outside of the dome structure through a notch N so that the hub shank halves 12a and 12b extend along opposite sides of a set of joined flange pairs $f2$, $f3$ and $f5$, $f6$, the hub shank halves embracing these flange pairs. The collar 15 is brought up against the outer ends of the joined or sandwiched flanges. A wing nut WN is screwed onto the threaded section 13 of the hub from inside the dome structure, thus drawing the hub halves together and clamping the flange sandwich $f2$, $f3$, $f5$, $f6$. The wing nut WN will also bear against the inner ends of the sandwiched flanges, and the soulder 14 will limit the screwing in of the nut WN so as to avoid crumpling the flanges. Rivets 19 are passed through the hub shank and the intervening set of sandwiched flange pairs for supplementing the clamping action of the hub halves and thus still further securing the flanges together.

As shown in FIGURES 15 and 16, the lowermost belt B1 of the modular dome structure is supported on the foundation F with provision for expansion and contraction resulting, for example, from temperature changes and applied loads. The foundation F is equipped with metallic fish plates FP having inclined grooves 20 which receive similarly inclined hubs H at the bottom of the lowermost belt B1. The hubs H at the bottom of the belt B1 can slide in the inclined grooves 20 to accommodate expansion or contraction of the bottom of the dome structure. As is clearly shown in FIGURE 16, each hub H at the bottom of the belt B1 clamps only a pair of flanges $f5$ and $f6$, there being no flanges $f2$, $f3$ at the bottom of the dome structure.

Depending upon anticipated load conditions, additional circumferential stress sustaining or reinforcement may be provided, especially in the lower part of the dome structure. In a typical case, the circumferential reinforcement may be provided from the dome structure base, that is at the bottom of the lowest modular belt B1 at thirty degrees above the sphere equator, to a level at forty-five degrees above the sphere equator. Preferably, this additional reinforcement is provided by flexible tensioning members such as wires or cables shown at T in FIGURES 11 and 13 as being passed through holes 17 in the projections 16 of the hubs H and extending circumferentially completely around the dome structure. The members T may be tensioned by any suitable means and secured in tensioned condition.

The dome structure above the modular belts B1–B14 is constituted by the cap structure C including the ring R. The upper dome structure C, R is constructed and connected to the underlying belt structure B1–B14 as shown particularly in FIGURES 2 and 17–22. The cap C includes a plurality of modules C1, C2, C3 . . . etc., of greater length on a chord of the sphere in a vertical plane than the modules in the belts B1–B14. Additionally, the cap modules are shaped differently and are connected differently from the shaping and the connection of the modules AM and IM in the underlying belts. Each cap module is of open face tetrahedral form and comprises a bottom face 21 in the shape of an isosceles triangle. Extending at an angle to the bottom face 21 of each cap module are side faces 22, 23, both shaped as asymmetrical triangles, the faces 21, 22 and 23 thus producing a trough-like tetrahedral structure, As shown in FIGURES 20 and 21, each cap module face 22 has a rolled edge 22a, and each module face 23 has an inverted U-shaped channel 23a which opens downwardly. The side faces 22 and 23 are close to each other adjacent to the ring R and diverge as they extend from the ring.

The ring R is provided with the V-shaped seats 24 and projecting studs 25.

In assembling the cap structure C, R, adjacent walls 22 and 23 of adjacent modules C1, C2, etc., are connected as indicated in FIGURES 18, 20 and 21, from which it is apparent that the U-shaped channel 23a at the top of the face 23 of the module C2 shown at the right in FIGURE 21 is fitted over the rolled edge 22a at the top of the face 22 of the module C1 at the left in FIGURE 21. If desired, the joint between the channel 23a and the rolled edge 22a may be cemented or otherwise secured.

The converging ends of the module faces 22–23 are placed into the seats 24 and the parts are manipulated so as to cause the studs 25 to project into the channels 23a and the rolled edges 22a, as indicated in FIGURE 17. This is permitted by the somewhat flexible nature of the sheet material.

The faces 21 of the cap modules are provided with flanges f21 which, together with the flanges f4 on the uppermost intervening modules IM, are secured, e.g., by rivets, to an annular collar piece CP inserted at the circular joint between the cap C and belt B14 as indicated in FIGURE 23, for anchorage of the cap module flange f21 and the belt B14 flanges f4. The ends of the converging faces 22 and 23 of the modules C1, C2, etc. have flanges f22 riveted to the ring R. Fenestration may be provided within the ring R.

In any construction in which stress and load considerations may make it advisable to provide circumferential reinforcement adjacent to the joint between the uppermost belt, such as B14, and the cap structure, a tensioning cable or other flexible tensioning means may be provided at that joint. For this purpose, a series of plugs P may be connected to the dome structure at circumferentially spaced intervals around the joint between the cap C and uppermost modular belt. As shown in FIGURES 19, 20 and 21, a plug P comprises a stem P1 which fits into the rolled edge 22a at a joint between two cap modules and a shoulder P2 which limits the insertion of the stem P1 into the rolled edge 22a. On its outer end, the plug P is provided with two spaced fingers P3. A tensioning cable or the like is inserted between the fingers P3 of the plugs P all around the periphery and is drawn tight and secured under tension. Extension of the tensioning member T between the fingers of one plug P is shown in FIGURE 19.

The construction thus far described is self-sustaining and capable of bearing substantial applied loads. However, this structure is constituted in part by tetrahedral modules AM and IM having open faces at the outside of the dome, the latter therefore having a multiplicity of depressions or pockets on its outer surface. It is desirable from the standpoint of appearance that these open faces be covered or closed so as to present a substantially smooth outer spherical surface. To this end, a plurality of shingles or shingle-like plate-like members S as shown in FIGURES 13, 15, 22, 23 and 26 are applied to the part of the dome structure constituted by the belts B1–B14.

With reference to FIGURE 13, a closure means component or shingle S is of diamond shape having flanged sides S1, S2, S3 and S4, and an apertured boss S5 at its bottom point at the convergence of the flanges S3 and S4. A full or complete shingle S is employed for covering certain modules in the belts B2–B13, whereas half shingles are employed for covering certain modules in the belts B1 and B14. These half shingles are provided by cutting a complete shingle S along its horizontal minor axis S6 as indicated in FIGURE 13, thus providing a bottom half shingle SB and a top half shingle ST.

Top half shingles ST are used for covering and closing the alternate modules AM in the lowermost belt B1. Each shingle half ST is fitted over a module AM in the belt B1 so as to close the fourth face of the tetrahedral module, and the inturned flanges S1 and S2 of the shingle ST are secured to faces 5 and 6 respectively of the intervening modules IM on each side of the covered module AM in the belt B1. The flanges may be secured to the faces 5 and 6 by blind rivets and/or cement.

Full shingles S are applied to cover the modules IM of the belt B1 and the alternate modules AM of the belt B2. A bottom part SB of a shingle S is fitted over an intervening module in the belt B1, and the shingle flanges S3 and S4 are lapped over the flanges S2 and S1 in the half shingles ST in the lower belt B1. The top part SB of this shingle S is fitted over an alternate module AM in the belt B2, the flanges S1 and S2 of this shingle S being respectively attached to faces 5 and 6 of modules IM in the belt B2. Full shingles S are applied in this manner from the belt B2 upwardly to the belt B13 with the lower ends of shingles in upper belts overlapping the upper ends of the shingles in belts immediately below. The shingles are secured in place additionally by screws 26 which pass through apertured bosses S5 and into the threaded holes 18 in projections 16 of the hubs H as indicated in FIGURE 23, reference being made also to FIGURE 15.

The intervening modules IM in the belt B14 at the top of the belt structure are covered by bottom shingle parts SB, the flanges S3 and S4 of which are turned down for attachment to the faces 3 and 2 of alternate modules in the belt B14.

In addition to closing the respective fourth faces of the tetrahedral modules AM and IM to present a continuous outer dome surface, the shingles S and shingle halves SB and ST serve to reinforce the modular structure.

Figure 2:
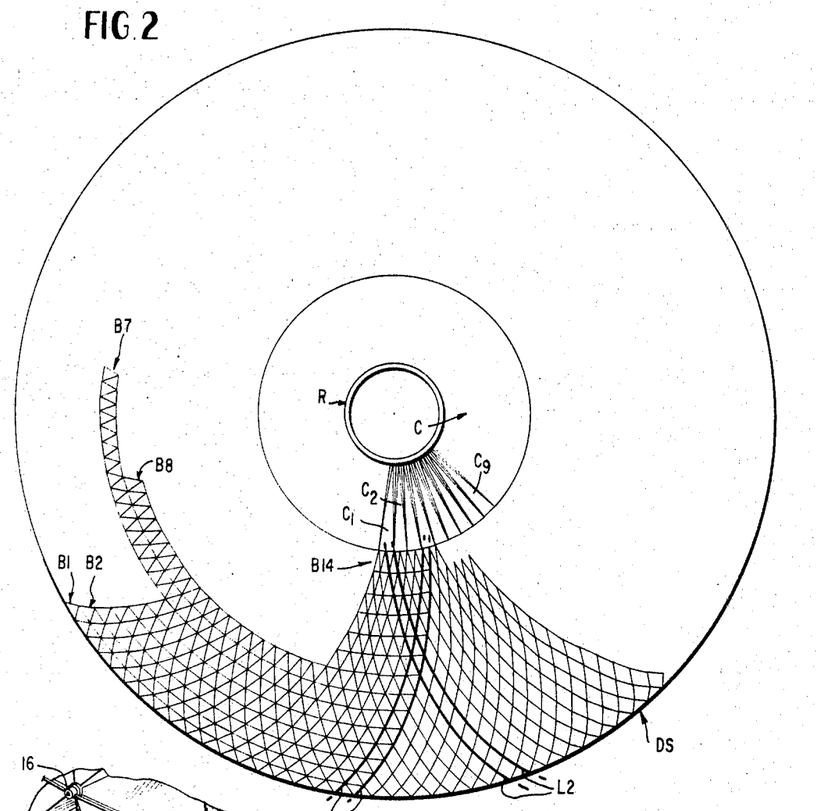
FIGURE 2, Sheet 2, is a fragmentary top plan view.

The multiple belt modular structure B1–B14 provides a plurality of trusses extending along the curved heavy lines L1 and L2 in FIGURES 1 and 2, the truss structures being more particularly illustrated in FIGURES 15, 22 and 23. Each truss line L1 passes from the bottom of the belt structure toward the top along a face 3 of a module AM and a contiguous face 5 of an adjacent module IM in the belt B1, then up along a face 3 of a module AM and a contiguous face 5 of an adjacent module IM in the belt 2, and so on up to the top of the belt structure, passing throughout along adjoining faces 3 and 5 of contiguous modules AM and IM in successive belts B3–B14. Thus, the alternate module faces 1 and 3 and the intervening module faces 4 and 5, together with the associated hubs H, provide a spiral truss extending along each line L1. It will be understood that although only two lines L1 are indicated in FIGURE 1, there are other similarly spiralled truss lines extending completely around the belt structure. In the form shown, the axis of each hub H is coincident with a radius of the sphere, and the length of the hub is a measurement of the depth or length of the truss rib.

A plurality of similar but reversely spiralled trusses extend along the lines represented at L2 in FIGURE 1. Each line L2 extends along faces 2 of alternate modules AM and respectively contiguous faces 6 of intervening modules IM in each belt.

Each truss extending in one spiral direction crosses over thirteen trusses of reversely spiralled directional extent and is secured to each such reversely spiralled truss at thirteen points by hubs H. In the illustrative embodiment, the depth of each module at the associated hub is one-half the length of the horizontal edge of the connected faces 1 and 4 of the modules AM and IM. The reversely spiralled truss structure provides a complex scissors-type truss system which is capable of effectively resisting twisting loads imposed onto the dome structure in any direction.

Figures 25, 26:
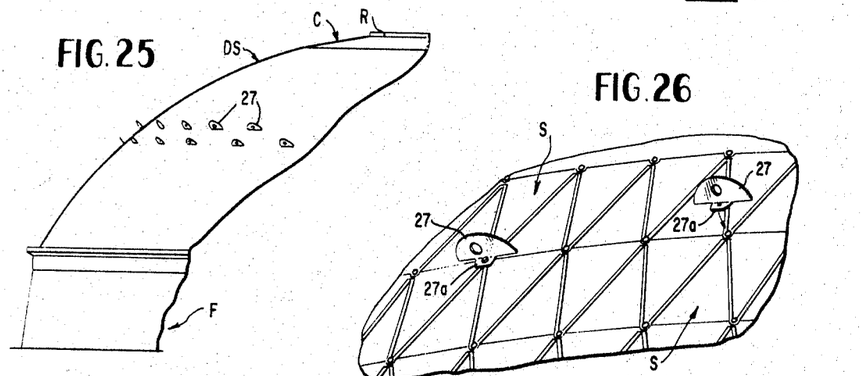
FIGURE 25, Sheet 6, is a fragmentary elevation of the dome structure equipped with fins serving as vortex generators for dissipating strong air currents which might otherwise cause too strong a wind pressure to be exerted on the dome.
FIGURE 26, Sheet 6, is a fragmentary enlarged scale perspective view showing the attachment of fins to the dome structure.

When a dome structure according to the present invention is to be erected in a locality where it may encounter unusual or substantial wind loads, its outer surfac preferably is provided with means for creating localized air turbulence so as to dissipate steady, concentrated wind pressure which might otherwise constitute a serious hazard. As shown in FIGURES 25 and 26, a plurality of vortex generators 27 are secured to the outer surface of the dome structure in spaced relation on the forty-five degree and fifty-one degree lines above the equator of the sphere. Each vortex generator 27 is in the form of an apertured fin having a flange 27a adapted to fit over a projection 16 on a hub H and to be secured in place by a screw 26.

It is apparent that domes constructed as explained in detail in the foregoing may be of different sizes. By way of example only, some of the dimensional relations of the illustrative embodiment will now be set forth. The illustrative dome structure is based on a diameter of 230.94 feet at the sphere equator and a diameter of two hundred feet at the bottom of the belt B1. The belts B1–B14 together extend from thirty degrees to seventy-two degrees above the equator, thus covering an extent of forty-two degrees on a vertical plane great circle of the sphere. Below the thirty degree line is the foundation F. The dome structure above the seventy-two degree line is constituted by the cap C and ring R.

Each belt extends substantially three degrees in the vertical plane great circle, the several belts and modules thus being of substantially the same height. However, since the several belts B1–B14 all include the same number of modules AM and IM, specifically two hundred and forty modules in the illustrative embodiment, the modules AM and IM decrease in circumferential extent from the belt B1 to the belt B14. There are one hundred and twenty cap modules C1, C2, etc.

The diamond-shaped shingles S are sufficiently large to overlap the associated modules and are also of substantially uniform height equivalent to 2 three degree radians in a vertical plane great circle, but decrease in width on their minor axes S6, indicated in FIGURES 13, from the belt B2 to the belt B14.

Further and somewhat specific guidance for constructing a geodesic dome according to the illustrative embodiment is provided by the following table listing dimensional relationships:

| Belt No. | Degrees covered by belt on vertical great circle | Radian in feet | Radian in feet at bottom of belt | Hub (14) depth, i.e. depth of truss rib | Altitude of module faces 1 and 4 in planes of these faces, inches | Width of strip (Figure 3) to provide stock for flanges f1–f6, inches |
|---|---|---|---|---|---|---|
| B1 | 30–33 | 5.236 | 100 | 2.6 | 79.2 | 84 |
| B2 | 33–36 | 5.070 | 96.85 | 2.5 | 78.5 | 84 |
| B3 | 36–39 | 4.89 | 93.41 | 2.4 | 78.0 | 84 |
| B4 | 39–42 | 4.70 | 89.74 | 2.35 | 77.5 | 84 |
| B5 | 42–45 | 4.49 | 85.81 | 2.25 | 77.0 | 84 |
| B6 | 45–48 | 4.275 | 81.65 | 2.1 | 76.5 | 84 |
| B7 | 48–51 | 4.045 | 77.25 | 2.0 | 76.0 | 84 |
| B8 | 51–54 | 3.80 | 72.66 | 1.9 | 75.5 | 80 |
| B9 | 54–57 | 3.55 | 67.88 | 1.75 | 75.0 | 80 |
| B10 | 57–60 | 3.29 | 62.89 | 1.65 | 74.4 | 80 |
| B11 | 60–63 | 3.05 | 57.73 | 1.50 | 74.0 | 80 |
| B12 | 63–66 | 2.74 | 52.42 | 1.37 | 73.7 | 80 |
| B13 | 66–69 | 2.46 | 46.97 | 1.23 | 73.0 | 80 |
| B14 | 69–72 | 2.16 | 41.38 | 1.08 | 72.8 | 80 |

The foregoing values are based on construction of the belt section B1–B14 from sheet aluminum of .036 inch thickness.

Dome structures in accordance with the invention are characterized importantly by face-linked tetrahedral modules so coordinated that a light structure comprising triangular subdivisions providing a built-in truss system is capable of withstanding heavy loads.

The construction disclosed is preferred, other than as to specific numerical dimensions which are exemplary only, but it is intended that the disclosure be illustrative rather than definitive, the invention being defined in the claims.

I claim:

1. In a geodesic dome, a substantially horizontal belt comprising an annular succession of adjacent face-linked tetrahedral modules the faces of which are triangular, two triangular faces of each alternate module in said succession of modules being in face-to-face contact respectively with two triangular faces of intervening modules on opposite sides of the included alternate module.

2. Geodesic dome structure according to claim 1 in which said modules are of sheet material.

3. Geodesic dome structure according to claim 1 in which said modules respectively comprise a first face having an edge substantially tangent to the belt; and second and third faces extending respectively from the other edges of said first face and each at an angle to said first face, the fourth face being delineated by one edge of each of said first, second and third faces.

4. Geodesic dome structure according to claim 3 in which said first face has the form of an isosceles triangle.

5. Geodesic dome structure according to claim 4 in which the modules are in a repeating series around the belt, in which said first faces are in the form of isosceles triangles, and in which the apices of said first faces of adjacent modules point respectively in substantially opposite directions.

6. Geodesic dome structure according to claim 5 in which the apices of said first faces of alternate modules point toward the top of the dome, and the apices of said first faces of intervening modules point toward the base of the dome.

7. Geodesic dome structure according to claim 3 in which each of the second and third faces of each module is positioned in face-to-face laminate relation to one of the second and third faces of an adjacent module in the succession of modules.

8. Geodesic dome structure according to claim 7 in which said face-to-face positioned faces of adjacent modules are secured together in contacting face-to-face engagement with each other.

9. Geodesic dome structure according to claim 1 in which said belt comprises a unitary piece of sheet material constituting a plurality of said modules.

10. Geodesic dome structure according to claim 3 in which said belt comprises a unitary piece of sheet material constituting a plurality of said modules.

11. Geodesic dome structure according to claim 5 in which said belt comprises a unitary piece of sheet material constituting a plurality of said modules.

12. Geodesic dome structure according to claim 7 in which said belt comprises a unitary piece of sheet material constituting a plurality of said modules.

13. Geodesic dome structure according to claim 5 in which said modules are of sheet material and in which said second and third faces of each module have mutually contiguous edges extending from the apex of said triangular first face and at an angle to said first face, said contiguous edges being secured together.

14. Geodesic dome structure according to claim 13 in which the apices of said first faces of alternate modules point toward the top of the dome, and the apices of said first faces of intervening modules point toward the bottom of the dome.

15. Geodesic dome structure according to claim 3 in which said belt comprises a unitary strip of sheet material having, in each module, angle bends intervening respectively between two edges of said first face and one edge of each of said second and third faces.

16. Geodesic dome structure according to claim 3 including, in each module, a member secured to the module for closing the fourth face thereof.

17. In a geodesic dome, a plurality of adjacent substantially horizontal belts in superimposed relation to each other, each of said belts comprising an annular succession of adjacent face-linked tetrahedral modules the faces of which are triangular, two triangular faces of each alternate module in said succession of modules being in face-to-face contact respectively with two triangular faces of intervening modules on opposite sides of the included alternate module; and means securing together the modules of adjacent belts.

18. Geodesic dome structure according to claim 17 in which said modules are of sheet material.

19. Geodesic dome structure according to claim 18 in which said modules respectively comprise a first face having a first edge substantially tangent to the associated belt; and second and third faces extending respectively from two other edges of said first face and each at an angle to said first face, the fourth face being delineated by one edge of each of said first, second and third faces, said first edge of said first face of each module in one belt lying parallel to and alongside of and being secured to said first edge of said first face of a module in an adjacent belt.

20. Geodesic dome structure according to claim 19 in which, in each belt, said modules are in a repeating series around the belt, in which said first faces are in the form of isosceles triangles, and in which the apices of said first faces of adjacent modules point respectively in substantially opposite directions, said first edge of said first face of each module being the side of said isosceles triangle opposite the apex thereof.

21. Geodesic dome structure according to claim 20 in which, in each belt, the apices of said first faces of alternate modules point toward the top of the dome, and the apices of said first faces of intervening modules point toward the base of the dome.

22. Geodesic dome structure according to claim 21 in which the modules in one belt which have apices which point toward the top of the dome have their said first edges of their said first faces secured respectively to the said first edges of the said first faces of modules, in an adjacent belt, which have apices which point toward the base of the dome.

23. Geodesic dome structure according to claim 17 in which said modules respectively comprise a first face having a first edge substantially tangent to the associated belt; and second and third faces extending respectively from two other edges of said first face, the fourth face being delineated by one edge of each of said first, second and third faces, said first edge of said first face of each module in one belt lying parallel to and alongside of said first edge of said first face of a module in an adjacent belt, and in which each of the second and third faces of each module is positioned in face-to-face laminate relation to one of the second and third faces of an adjacent module in the same belt.

24. Geodesic dome structure according to claim 23 in which said face-to-face positioned faces of adjacent modules are secured together in contacting face-to-face laminate engagement with each other.

25. Geodesic dome structure according to claim 17 in which each said belt comprises a unitary piece of sheet material constituting a plurality of the modules in that belt.

26. Geodesic dome structure according to claim 20 in which said modules are of sheet material, in which said second and third faces of each module have mutually contiguous edges extending from the apex of the associated triangular first face and at an angle to said first face, in which said contiguous edges are secured together as a pair, and in which such pairs of secured-together edges of modules in adjacent belts are themselves secured together as a set of pairs.

27. Geodesic dome structure according to claim 26 in which there is a plurality of sets of such secured-together pairs, and in which, in each set of secured-together pairs, one pair is sandwiched between the secured-together edges of the other pair.

28. Geodesic dome structure according to claim 26 including, for each set of two secured-together pairs, a hub which secures together in laminate all of the four edges constituting the set.

29. Geodesic dome structure according to claim 28 in which said hubs have opposed sections which are drawn toward each other to clamp the secured-together pairs therebetween.

30. Geodesic dome structure according to claim 28 including, in each module, a member closing the fourth face thereof, said hubs respectively having outer ends at said fourth faces of the modules; and means for securing said members to said outer ends of said hubs and to said modules.

31. Geodesic dome structure according to claim 17 in which said modules respectively comprise a first triangular face having a first edge substantialy tangent to the associated belt; and second and third triangular faces extending respectively from two other edges of said first triangular face and each at an angle to said first triangular face, the fourth face also being triangular and being delineated by one edge of each of said first, second and third triangular faces, said first edge of said first triangular face of each module in one belt lying parallel to and alongside of the first edge of the first triangular face of a module in an adjacent belt, the second and third triangular faces of each module converging to mutually contiguous and aligned edges which, along a meeting line, are also contiguous to and aligned with the mutually contiguous and aligned edges of the converging second and third triangular faces of a module in an adjacent belt, said structure further including holding means for securing together the four aligned contiguous edges which meet each other along each of said meeting lines.

32. Geodesic dome structure according to claim 31 including closure means closing the fourth face of each module; and means for attaching said closure means to said holding means.

33. Geodesic dome structure according to claim 31 including diamond shaped plate-like members closing the 2 fourth faces of each two modules in adjacent belts which have their respective said first edges lying parallel to and alongside each other.

34. Geodesic dome structure according to claim 33 in which said diamond shaped plate-like members are disposed on said structure as shingles, those closing module fourth faces in higher belts lapping over those closing module fourth faces in adjacent lower belts.

35. Geodesic dome structure according to claim 20 in which said module first faces are in the form of isosceles triangles of substantially equal extent in successive belts from the base of the dome toward the top thereof but which are progressively more narrow around the dome from one belt to the next belt from base to top of the dome.

36. Geodesic dome structure according to claim 19 in which said module first faces are in the form of isosceles triangles, said structure further including at least one flexible tension band intervening between adjacent belts, passing around the dome structure and being connected thereto where said first edges of said first faces of modules in adjacent belts are secured to each other.

37. Geodesic dome structure according to claim 35 in which the belts comprising modules of substantially equal extent from base toward top terminate at a level below the top of the dome, and in which there is a cap above said level comprising modules which are of greater extent from base toward top than the modules below said level.

38. Geodesic dome structure according to claim 19 in which said module first faces are in the form of isosceles triangles, and in which said belts terminate at a level below the top of the dome, said structure further including a dome top member at the top of the highest of said belts and to which the modules of said highest belt are connected.

39. In a geodesic dome, a plurality of substantially horizontal belts in superimposed relation to each other, each of said belts comprising a succession of adjacent face-linked tetrahedral modules, said modules respectively comprising a first face in the form of an isosceles triangle and having a first edge substantially tangent to the associated belt, and second and third triangular faces extending respectively from two other edges of said first face and each at an angle to said first face, the fourth face being delineated by one edge of each of said first, second and third faces, the modules in each belt being in a repeating series of alternate and intervening modules, each alternate module having its apex which is opposite its said first edge of its said first face pointing toward the dome top, and each intervening module having its apex which is opposite its said first edge of its said first face pointing toward the dome bottom, the said first edges of said first faces of alternate modules in one belt adjoining the said first edges of said first faces in intervening modules in an adjacent belt, said second and third faces of the respective modules converging upon and meeting each other along a rib line extending from the aforesaid apex of the associated first face and at an angle to said first face; and means for securing together the meeting portions of said second and third faces of modules in adjacent belts along said rib lines, the so secured-together modules providing a plurality of trusses extending spirally from the base toward the top of the dome, each of said trusses comprising edges of said second and third faces of modules in the ascending belts and the rib line secured-together meeting portions of said module second and third faces.

40. Geodesic dome structure according to claim 39 in which said second and third faces of said modules have mutually contiguous edges meeting each other in pairs along said rib line, in which each such pair in an alternate module in one belt engages such a pair in an intervening module in an adjacent belt, and in which said means for securing comprises means for clamping together each two engaging pairs.

41. Geodesic dome structure according to claim 39 in which said means for securing extend along said rib lines to provide reinforced truss ribs.

42. Geodesic dome structure according to claim 39 in which said belts respectively comprise a unitary metal strip providing a plurality of said modules, and in which said second and third faces of said modules are in the form of asymmetrical triangles.

43. Geodesic dome structure according to claim 39 in which a first plurality of said trusses are spiralled in one direction and a second plurality of said trusses are spiralled in the reverse direction and cross over the trusses of said first plurality of trusses.

44. Geodesic dome structure according to claim 17 including a plurality of wind vortex generators on the outside of said belts.

References Cited

UNITED STATES PATENTS

| 2,736,072 | 2/1956 | Woods | 52—81 |
| 2,768,432 | 10/1956 | Hines | 52—81 X |
| 2,769,409 | 11/1956 | Rutten | 52—81 |
| 2,982,290 | 5/1961 | Hunziker | 52—81 X |
| 3,094,708 | 6/1963 | Caldwell | 52—81 X |

JOHN E. MURTAGH, Primary Examiner.

U.S. Cl. X.R.

52—173